United States Patent [19]
Toyama

[11] Patent Number: 5,621,575
[45] Date of Patent: Apr. 15, 1997

[54] WIDE ANGLE LENS SYSTEM

[75] Inventor: Nobuaki Toyama, Saitama-ken, Japan

[73] Assignee: Fuji Photo Optical Co., Ltd., Saitama-ken, Japan

[21] Appl. No.: 611,908

[22] Filed: Mar. 6, 1996

[30] Foreign Application Priority Data

Apr. 11, 1995 [JP] Japan ................................. 7-085471

[51] Int. Cl.$^6$ ................................. G02B 13/04
[52] U.S. Cl. ............................ 359/753; 359/751
[58] Field of Search .................... 359/749, 750, 359/751, 752, 753

[56] References Cited

U.S. PATENT DOCUMENTS 5,218,480  6/1993  Moskovich ................. 359/751

FOREIGN PATENT DOCUMENTS 55-43373  4/1980  Japan .
3297444  11/1991  Japan .

Primary Examiner—Scott J. Sugarman
Attorney, Agent, or Firm—Leydig, Voit & Mayer

[57] ABSTRACT

In a wide range of photographing from long shot to close-up, high resolving power and high contrast can be obtained in a wide angle lens system. The wide angle lens system comprises, successively from the object side, a negative meniscus first lens (L1), a junction lens composed of a positive second lens (L2) with a convex surface facing the object and a negative third lens (L3) with a concave surface facing the image, a junction lens composed of a biconvex fourth lens (L4) and a biconcave fifth lens (L5), a positive sixth lens (L6) with a convex surface facing the image, and a negative meniscus seventh lens (L7) with a convex lens facing the image. Also, it satisfies the following conditions (1) to (4):

(1) $-1.95 < F_1/f < -1.05$
(2) $1.05 < f_{23}/f < 3.60$
(3) $1.10 < f_{45}/f < 2.16$
(4) $1.53 < (r_{11}+r_{10})/(r_{11}-r_{10}) < 4.95$

2 Claims, 12 Drawing Sheets

WIDE ANGLE LENS SYSTEM

BACKGROUND OF THE INVENTION

1. Field of the Invention

The present invention relates to a wide angle lens system and, in particular, to a compact wide angle lens system used for lens-shutter cameras.

2. Related Background Art

Object-type lens systems encompassing a wide angle have conventionally been known. Among them, those in which concave, convex, and concave lenses (lens groups) are successively disposed to constitute a lens system are disclosed in Japanese Patent Laid-Open Nos. 56-140311 and 5-134175, for example.

The lens system disclosed in Japanese Patent Laid-Open No. 56-140311 is constituted by six sheets of lenses. While it is advantageous in that the number of the lenses used is small and its aberrations such as image surface distortion and spherical aberration are favorably corrected, it is disadvantageous in that its F number is 5.6, which is relatively dark.

On the other hand, while the lens system disclosed in Japanese Patent Laid-Open No. 5-134175 has an F number as bright as 2.8, it is disadvantageous in that, since its image surface distortion as well as spherical aberration is large, its focal movement at the time of zooming is large.

SUMMARY OF THE INVENTION

In order to overcome the foregoing disadvantages, the object of the present invention is to provide a wide angle lens system which is constituted by a relatively small number of lenses and can attain a large photographing angle of view with little strain aberration, whereby various kinds of aberration in a wide range of photographing from long shot to close-up can be favorably corrected.

The wide angle lens system in accordance with the present invention comprises, successively from the object side, a negative meniscus first lens with a convex surface facing the object, a first junction lens composed of a positive second lens with a convex surface facing the object and a negative third lens with a concave surface facing the image, a second junction lens composed of a biconvex fourth lens and a biconcave fifth lens, a positive sixth lens with a convex surface facing the image, and a negative meniscus seventh lens with a convex lens facing the image; while satisfying the following conditions (1) to (4):

(1) $-1.95 < f_1/f < -1.05$ (2) $1.05 < f_{23}/f < 3.60$ (3) $1.10 < f_{45}/f < 2.16$ (4) $1.53 < (r_{11}+r_{10})/(r_{11}-r_{10}) < 4.95$ wherein f is combined focal length of this wide angle lens system as a whole, $f_1$ is focal length of the first lens, $f_{23}$ is combined focal length of the second and third lenses, $f_{45}$ is combined focal length of the fourth and fifth lenses, $r_{10}$ is radius of curvature of the surface of the sixth lens facing the image, and $r_{11}$ is radius of curvature of the surface of the seventh lens facing the object.

As each lens is configured so as to satisfy the above-mentioned conditions in the present invention, various kinds of aberration in a wide range of photographing from long shot to close-up can be favorably corrected, whereby high optical performances can be obtained in the whole object distance.

Among the above-mentioned conditions, beyond the upper limit of condition (1), spherical aberration and image surface distortion may increase such that it may become difficult for them to be corrected. Below the lower limit of condition (1), on the other hand, coma may increase and may not be easily corrected.

Also, beyond the upper limit of condition (2), image surface distortion and coma may increase such that it may become difficult for them to be corrected; whereas, below its lower limit, spherical aberration and coma may increase such that it may become difficult for them to be corrected.

Further, beyond the upper limit of condition (3), spherical aberration and image surface distortion may increase such that it may become difficult for them to be corrected; whereas, below its lower limit, spherical aberration and coma may increase such that it may become difficult for them to be corrected.

Also, beyond the upper limit of condition (4), coma may be insufficiently corrected; whereas, below its lower limit, image surface distortion may be insufficiently corrected. In any case, the subsequent correction may become difficult.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE PREFERRED EMBODIMENTS

In the following, embodiments of the present invention will be explained with reference to attached drawings.

Embodiment 1

Figure 1:
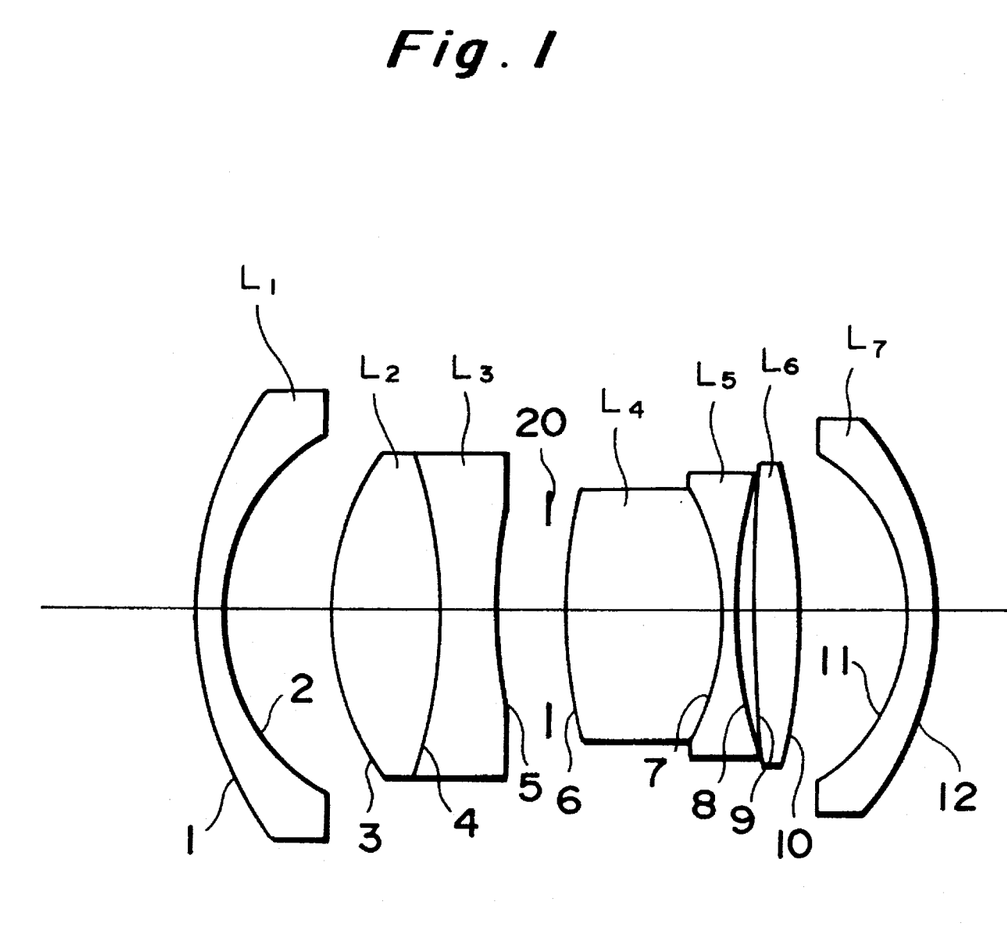
FIG. 1 is a schematic view showing the configuration of the wide angle lens system in accordance with Embodiment 1 of the present invention.

FIG. 1 shows the configuration of the wide angle lens system in accordance with this embodiment.

This wide angle lens system comprises first lens L1 to seventh lens L7 disposed on an optical axis 1 in this order.

The first lens L1 is a negative meniscus lens with a convex surface facing the object, while the second lens L2 is a positive lens with a convex surface facing the object. The third lens L3 is a negative lens with a concave surface facing the object. The second lens L2 and the third lens L3 are joined together at their lens surfaces 4 to form a first junction lens. By way of a stop 20, the fourth lens L4, which is constituted by a biconvex lens, is disposed on the image side of the third lens L3. The fifth lens L5 is a biconcave lens. The fourth lens L4 and the fifth lens L5 are joined together at their lens surfaces 7 to form a second junction lens. The sixth lens L6 is a lens having a positive refractive index with a convex surface facing the image, whereas the seventh lens L7 is a negative meniscus lens with a convex surface facing the image.

Assuming that combined focal length of this wide angle lens system as a whole is f, focal length of the first lens L1 is $f_1$, combined focal length of the second and third lenses L2 and L3 is $f_{23}$, combined focal length of the fourth and fifth lenses L4 and L5 is $f_{45}$, radius of curvature of the surface of the sixth lens L6 facing the image is $r_{10}$, and radius of curvature of the surface of the seventh lens L7 facing the object is $r_{11}$, the wide angle lens systems constituted by the first lens L1 to seventh lens L7 are defined so as to satisfy the following conditions (1) to (4):

(1) $-1.95 < f_1/f < -1.05$ (2) $1.05 < f_{23}/f < 3.60$ (3) $1.10 < f_{45}/f < 2.16$ (4) $1.53 < (r_{11}+r_{10})/(r_{11}-r_{10}) < 4.95$

In this embodiment, in order to satisfy the above-mentioned conditions (1) to (4), values are defined as follows:

$f_1/f = -1.16$ $f_{23}/f = 1.21$ $f_{45}/f = 1.22$ $(r_{11}+r_{10})/(r_{11}-r_{10}) = 1.70$

Figure 2A:
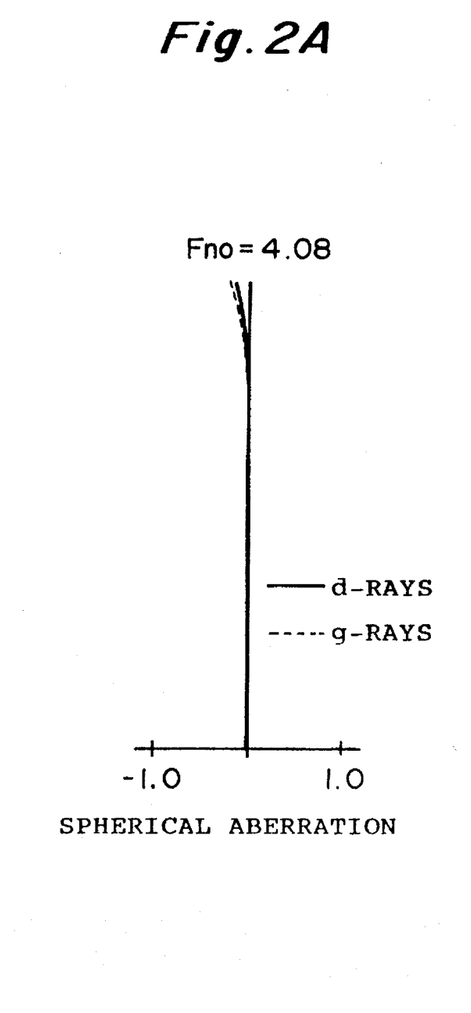
FIGS. 2A to 2C are aberration charts for the wide angle lens system in accordance with Embodiment 1 of the present invention.
Figure 2B:
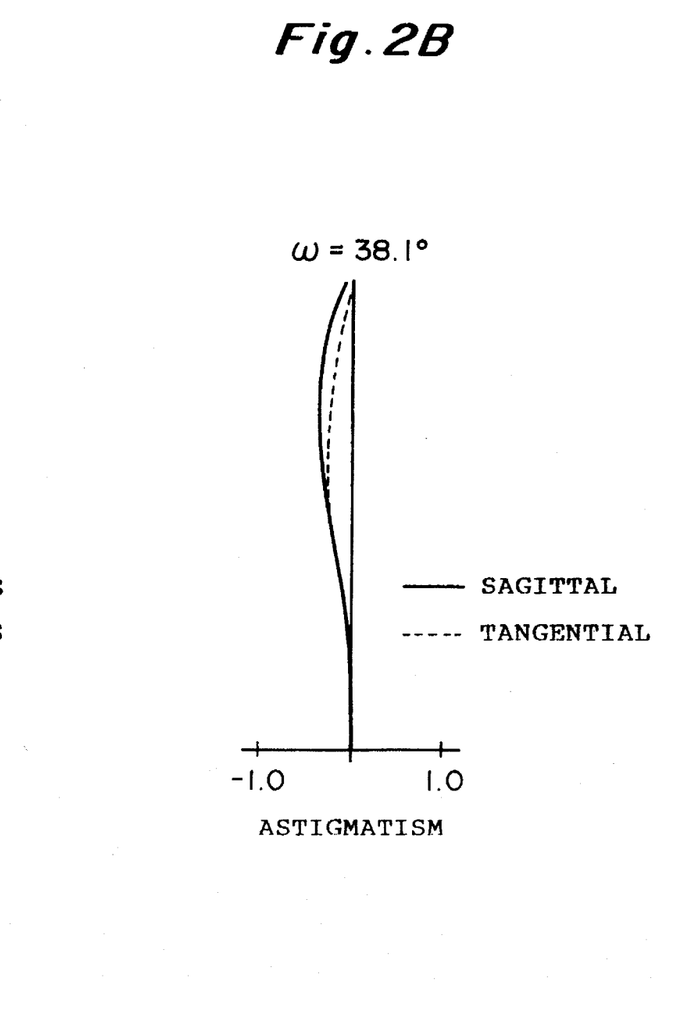
Figure 2C:
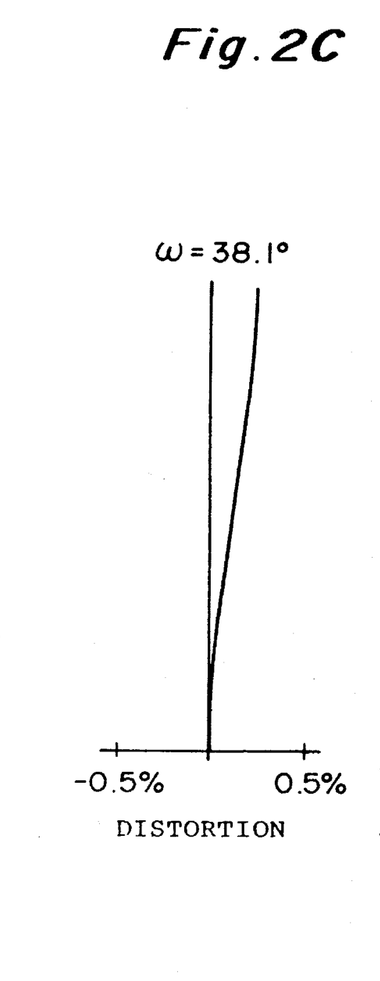

The overall characteristics of the wide angle lens system in Embodiment 1 and characteristics of the respective lenses therein are shown in Table 1, while its aberration characteristics are shown in FIGS. 2A to 2C. In Table 1, Fno, 2ω, r, d, n, and v respectively indicate F number, angle of view, radius of curvature of each lens surface, distance between neighboring lens surfaces, refractive index with respect to d-rays, and abbe number. Also, in FIG. 2A, continuous curve and dotted curve respectively indicate spherical aberration and sine condition.

TABLE 1

| Surface Number | r | d | n | v |
|---|---|---|---|---|
| 1 | 54.122 | 4.03 | 1.63483 | 45.69 |
| 2 | 30.256 | 15.46 | | |
| 3 | 41.637 | 15.18 | 1.66778 | 47.19 |
| 4 | −72.103 | 7.84 | 1.68568 | 35.23 |
| 5 | 70.600 | 10.08 | | |
| 6 | 88.729 | 22.10 | 1.80500 | 47.50 |
| 7 | −39.076 | 2.24 | 1.57064 | 41.75 |
| 8 | 79.504 | 2.36 | | |
| 9 | 334.722 | 6.04 | 1.80500 | 47.50 |
| 10 | −110.474 | 15.60 | | |
| 11 | −28.656 | 4.03 | 1.80500 | 24.75 |
| 12 | −42.901 | 58.13 | | |
| f = 100.00 | | $F_{no}$ = 4.08 | | 2ω = 77.2° |

Embodiment 2

Figure 3:
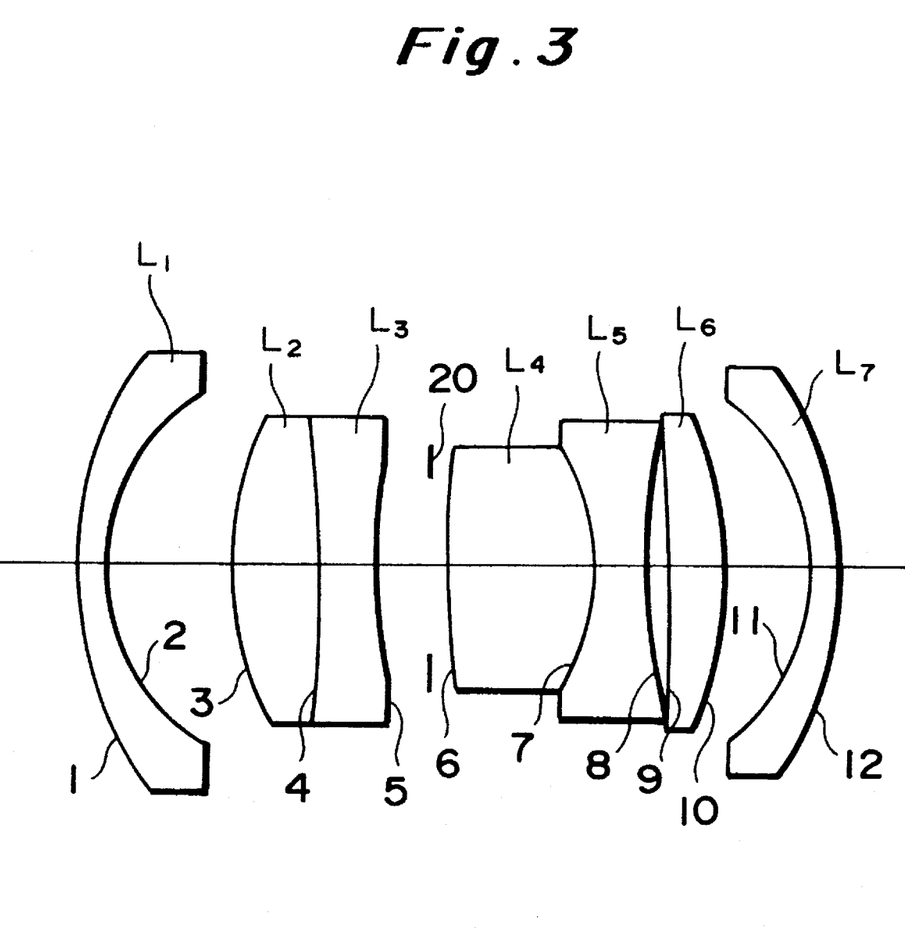
FIG. 3 is a schematic view showing the configuration of the wide angle lens system in accordance with Embodiment 2 of the present invention.

FIG. 3 shows the configuration of the wide angle lens system in accordance with this embodiment. In this embodiment, in order to satisfy the above-mentioned conditions (1) to (4), values are defined as follows:

$f_1/f = -1.23$ $f_{23}/f = 1.25$ $f_{45}/f = 1.23$ $(r_{11}+r_{10})/(r_{11}-r_{10}) = 2.88$

Figure 4A:
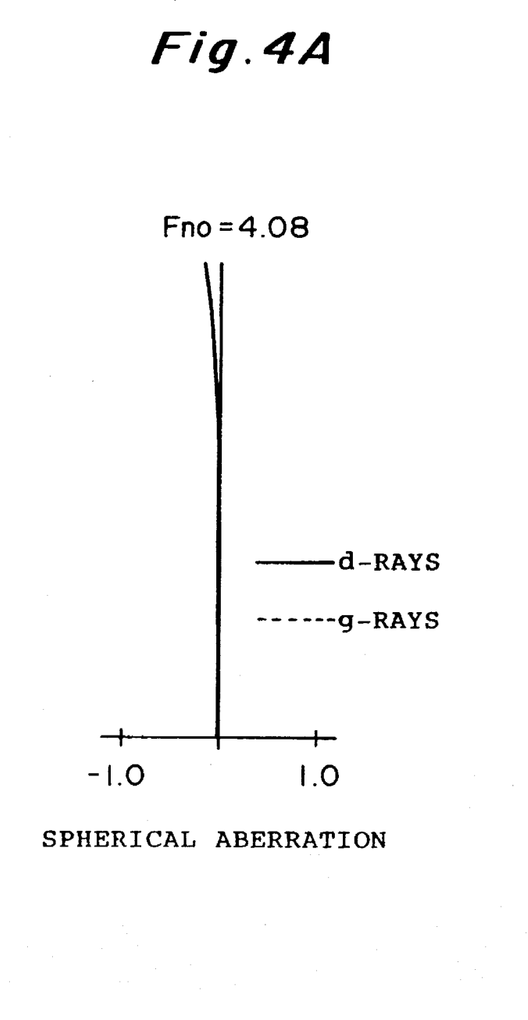
FIGS. 4A to 4C are aberration charts for the wide angle lens system in accordance with Embodiment 2 of the present invention.
Figures 4B, 4C:
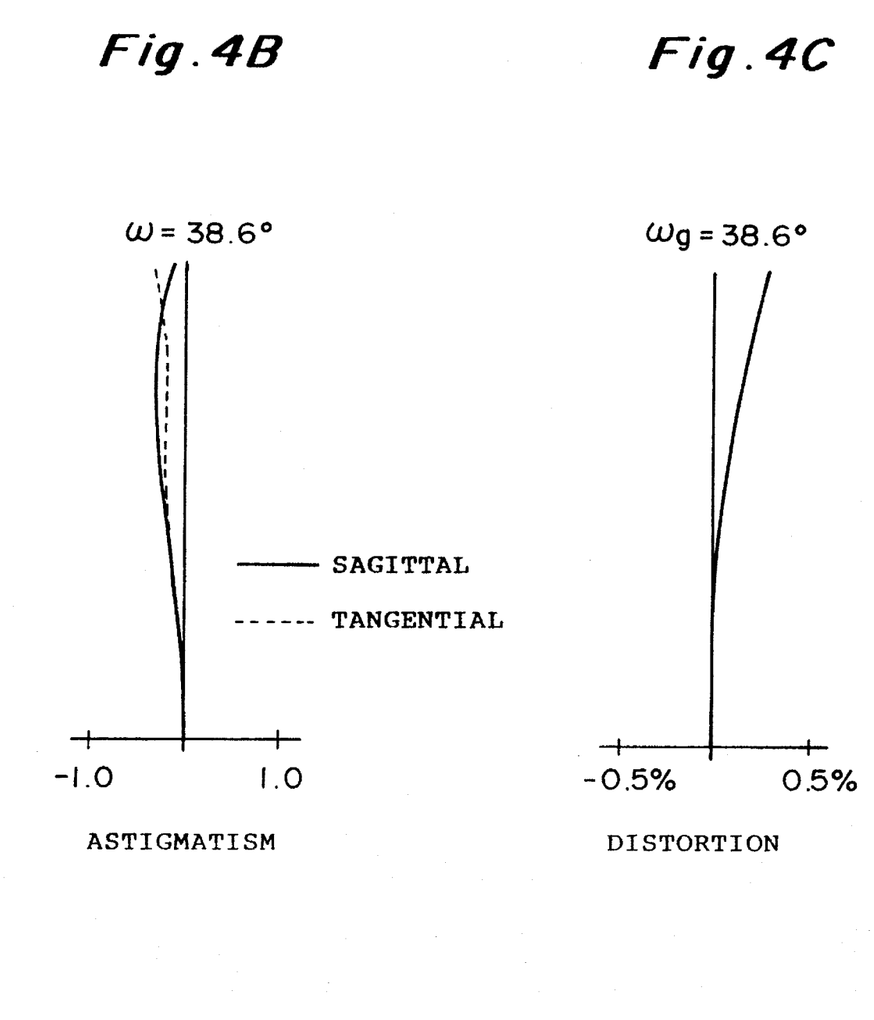

The overall characteristics of the wide angle lens system in Embodiment 2 and characteristics of the respective lenses therein are shown in Table 2, while its aberration characteristics are shown in FIGS. 4A to 4C. Here, in FIG. 4A, continuous curve and dotted curve respectively indicate spherical aberration and sine condition.

TABLE 2

| Surface Number | r | d | n | v |
|---|---|---|---|---|
| 1 | 55.486 | 4.09 | 1.62010 | 48.64 |
| 2 | 31.245 | 17.62 | | |
| 3 | 50.979 | 12.81 | 1.80500 | 39.09 |
| 4 | −202.590 | 7.95 | 1.80387 | 24.81 |
| 5 | 84.090 | 10.23 | | |
| 6 | 135.488 | 20.67 | 1.80500 | 47.50 |
| 7 | −39.788 | 7.95 | 1.55523 | 44.65 |
| 8 | 131.528 | 2.89 | | |
| 9 | −319.581 | 7.39 | 1.80500 | 47.50 |
| 10 | −64.937 | 13.27 | | |
| 11 | −31.439 | 4.09 | 1.80500 | 24.75 |
| 12 | −51.739 | 61.57 | | |
| f = 100.00 | | $F_{no}$ = 4.08 | | 2ω = 77.2° |

Embodiment 3

Figure 5:
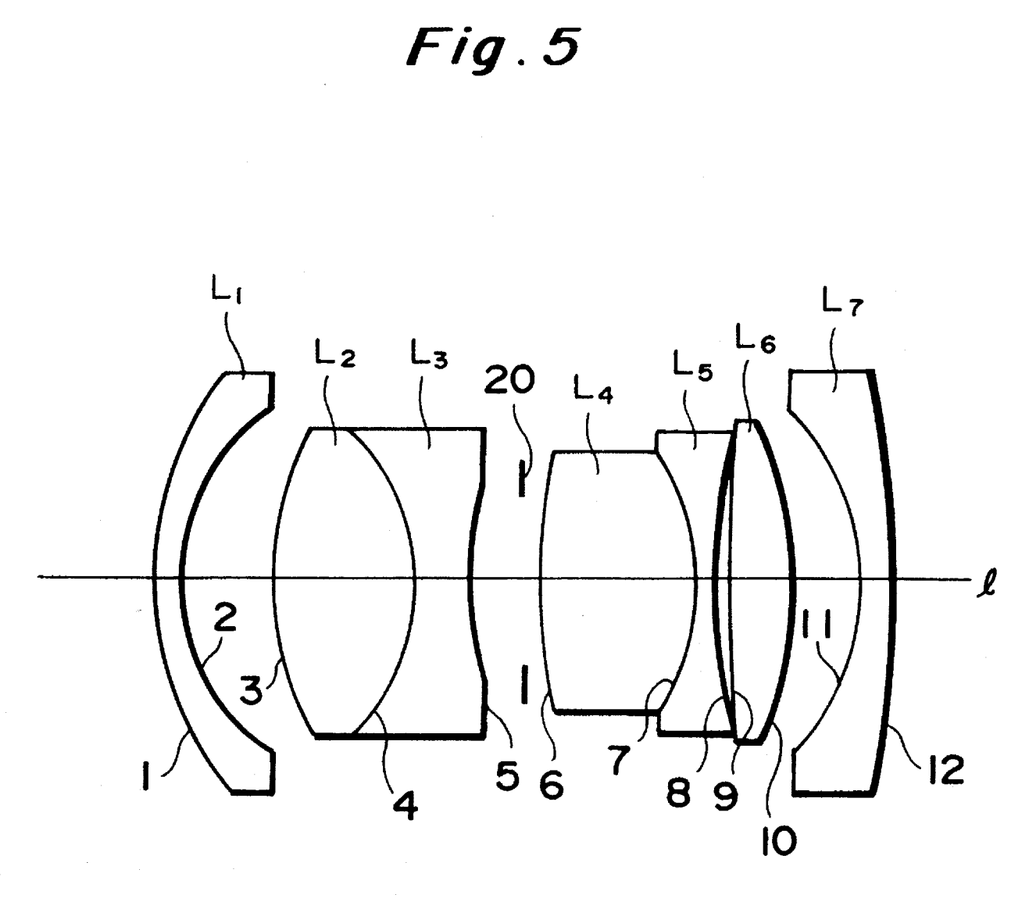
FIG. 5 is a schematic view showing the configuration of the wide angle lens system in accordance with Embodiment 3 of the present invention.

FIG. 5 shows the configuration of the wide angle lens system in accordance with this embodiment. In this embodiment, in order to satisfy the above-mentioned conditions (1) to (4), values are defined as follows:

$f_1/f = -1.77$ $f_{23}/f = 1.97$ $f_{45}/f = 1.55$ $(r_{11}+r_{10})/(r_{11}-r_{10}) = 4.50$

Figure 6A:
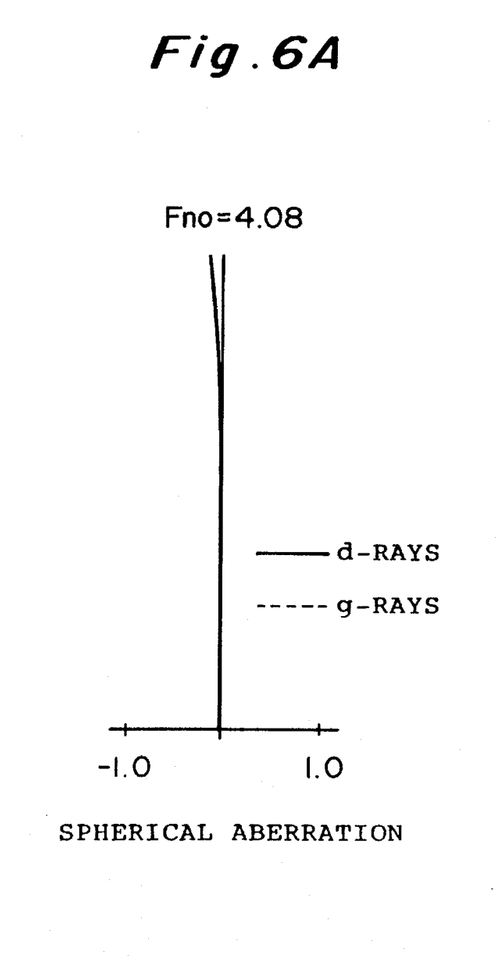
FIGS. 6A to 6C are aberration charts for the wide angle lens system in accordance with Embodiment 3 of the present invention.
Figure 6B:
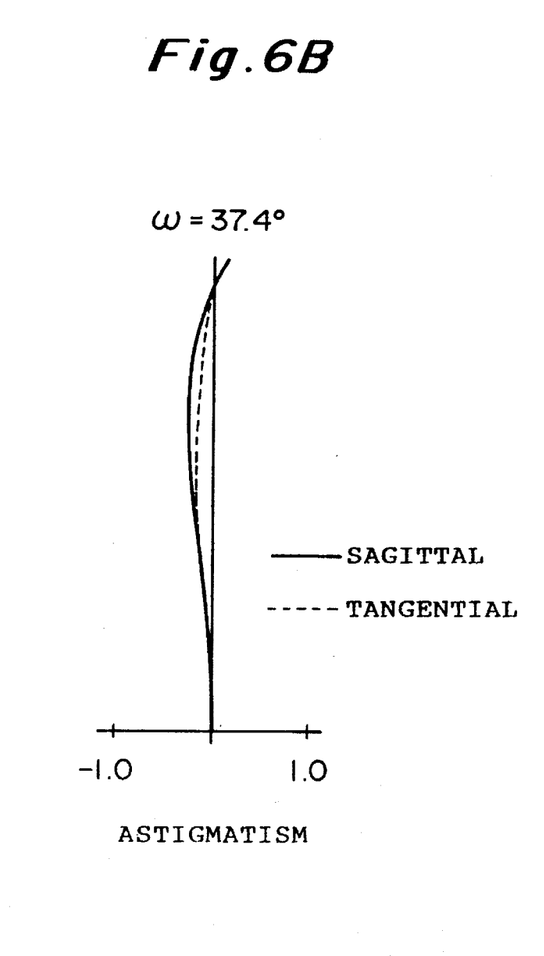
Figure 6C:
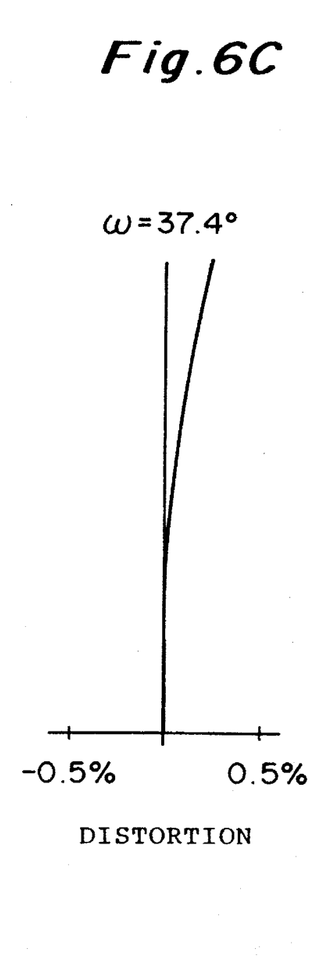

The overall characteristics of the wide angle lens system in Embodiment 3 and characteristics of the respective lenses therein are shown in Table 3, while its aberration characteristics are shown in FIGS. 6A to C. Here, in FIG. 6A, continuous curve and dotted curve respectively indicate spherical aberration and sine condition.

TABLE 3

| Surface Number | r | d | n | ν |
|---|---|---|---|---|
| 1 | 45.895 | 3.92 | 1.49804 | 55.37 |
| 2 | 29.337 | 12.98 | | |
| 3 | 47.708 | 18.99 | 1.60135 | 61.10 |
| 4 | −31.249 | 7.63 | 1.60101 | 54.17 |
| 5 | 63.013 | 9.80 | | |
| 6 | 107.167 | 21.79 | 1.80500 | 47.50 |
| 7 | −33.105 | 2.32 | 1.64288 | 34.08 |
| 8 | 103.925 | 2.24 | | |
| 9 | 889.052 | 8.44 | 1.80069 | 47.93 |
| 10 | −53.996 | 9.83 | | |
| 11 | −34.361 | 3.92 | 1.52000 | 51.25 |
| 12 | −150.683 | 61.89 | | | f = 100.00   $F_{no}$ = 4.08   2ω = 74.8°

Embodiment 4

Figure 7:
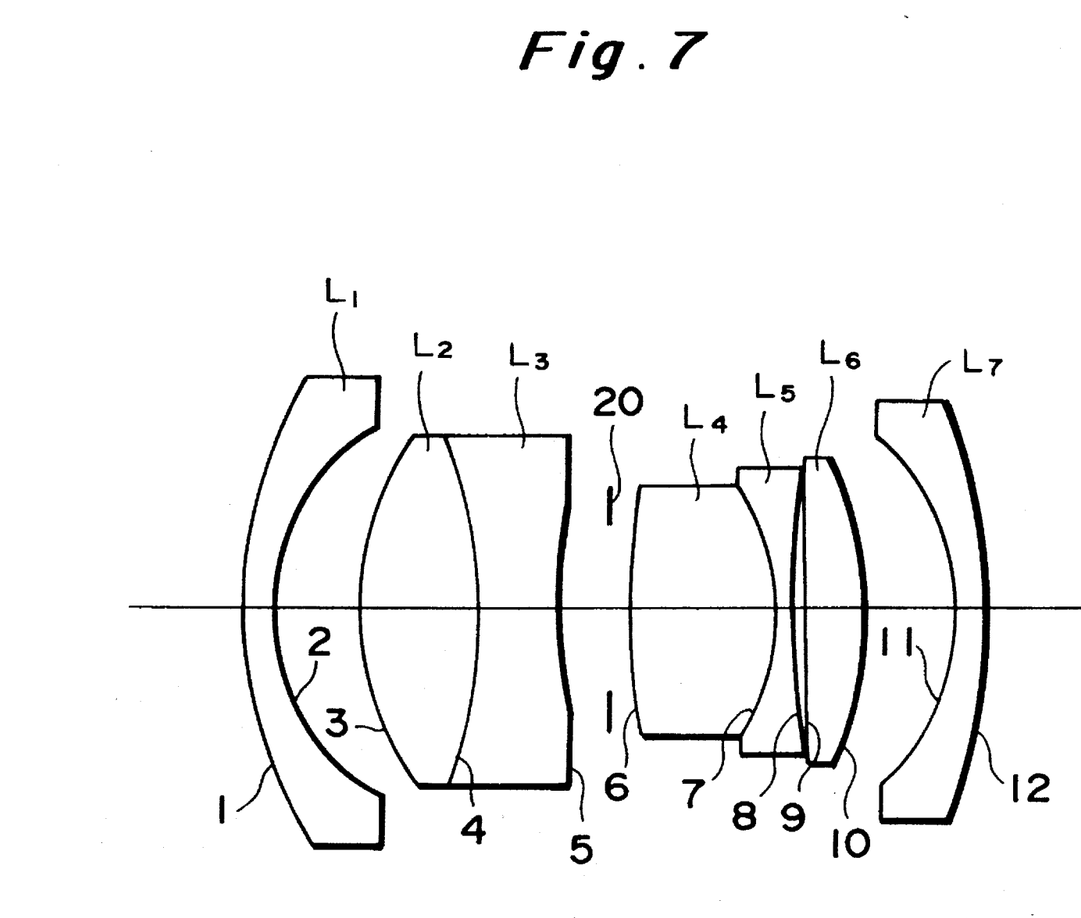
FIG. 7 is a schematic view showing the configuration of the wide angle lens system in accordance with Embodiment 4 of the present invention.

FIG. 7 shows the configuration of the wide angle lens system in accordance with this embodiment. In this embodiment, in order to satisfy the above-mentioned conditions (1) to (4), values are defined as follows:

$f_1/f = -1.77$ $f_{23}/f = 1.14$ $f_{45}/f = 1.95$ $(r_{11}+r_{10})/(r_{11}-r_{10}) = 400$

Figure 8A:
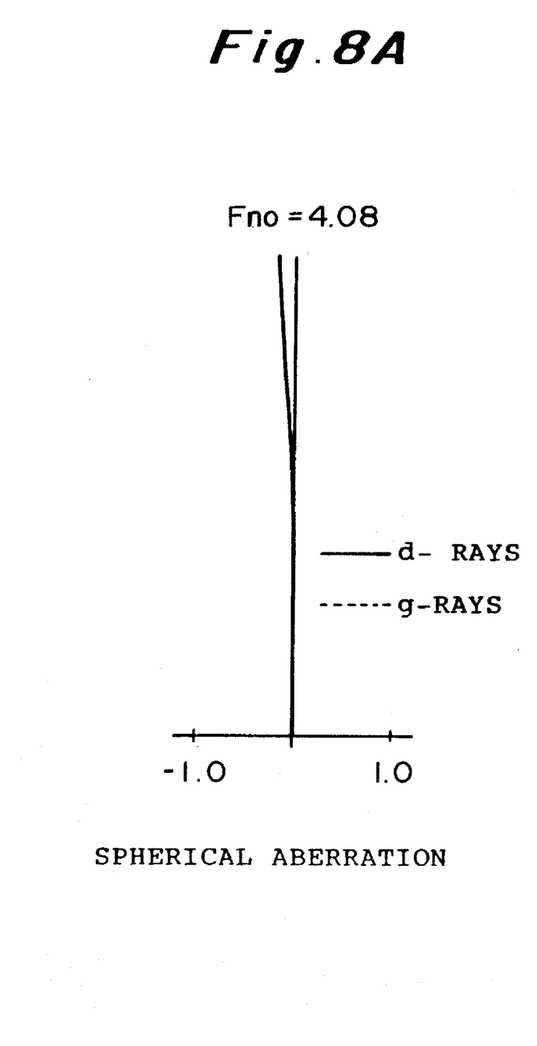
FIGS. 8A to 8C are aberration charts for the wide angle lens system in accordance with Embodiment 4 of the present invention.
Figure 8B:
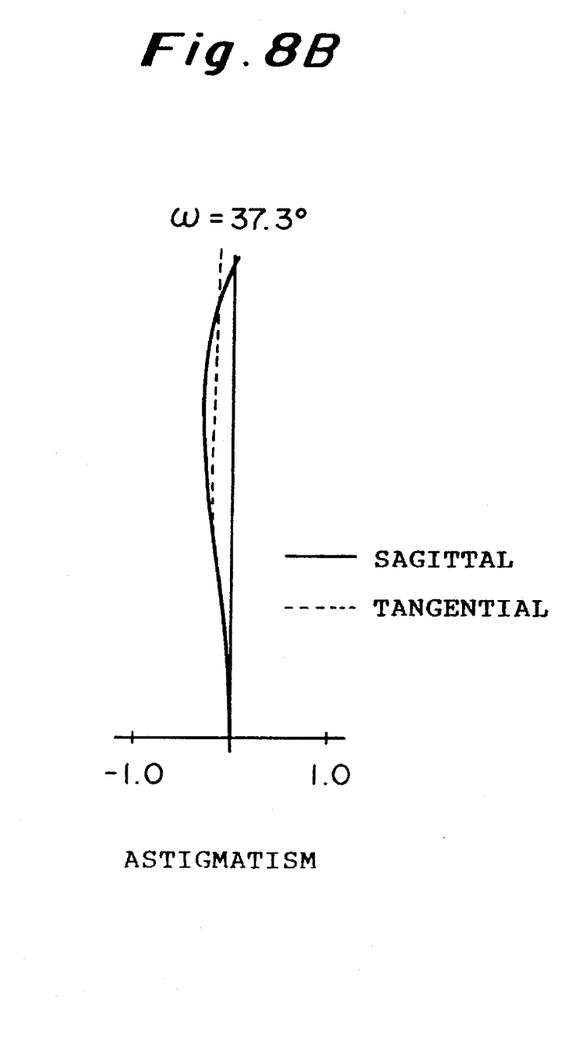
Figure 8C:
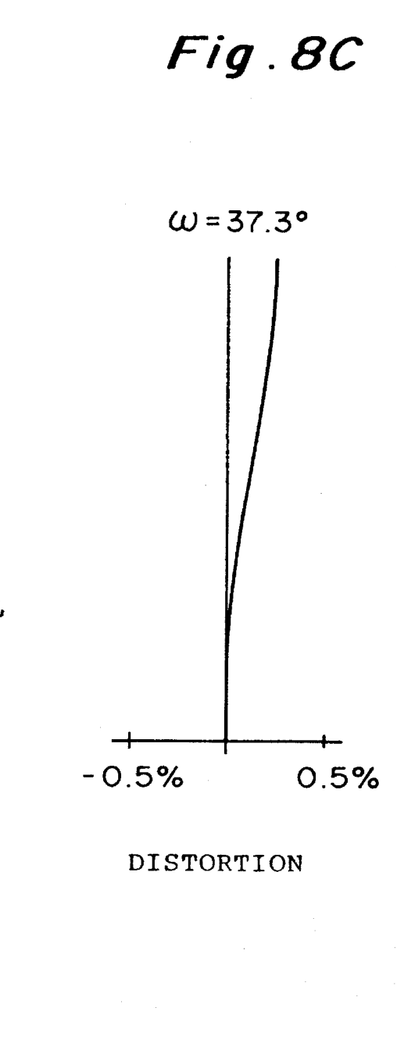

The overall characteristics of the wide angle lens system in Embodiment 4 and characteristics of the respective lenses therein are shown in Table 4, while its aberration characteristics are shown in FIGS. 8A to 8C. Here, in FIG. 8A, continuous curve and dotted curve respectively indicate spherical aberration and sine condition.

TABLE 4

| Surface Number | r | d | n | ν |
|---|---|---|---|---|
| 1 | 63.610 | 3.91 | 1.51752 | 56.58 |
| 2 | 30.374 | 12.14 | | |
| 3 | 43.268 | 15.67 | 1.73304 | 54.70 |
| 4 | −76.870 | 10.87 | 1.71321 | 43.37 |
| 5 | 62.579 | 9.79 | | |
| 6 | 100.699 | 20.33 | 1.80500 | 38.69 |
| 7 | −35.045 | 2.17 | 1.72218 | 28.89 |
| 8 | 129.142 | 2.11 | | |
| 9 | −979.184 | 7.52 | 1.80500 | 47.50 |
| 10 | −53.750 | 13.07 | | |
| 11 | −32.250 | 3.91 | 1.52000 | 51.68 |
| 12 | −76.915 | 59.99 | | | f = 100.00   $F_{no}$ = 4.08   2ω = 74.6°

Embodiment 5

Figure 9:
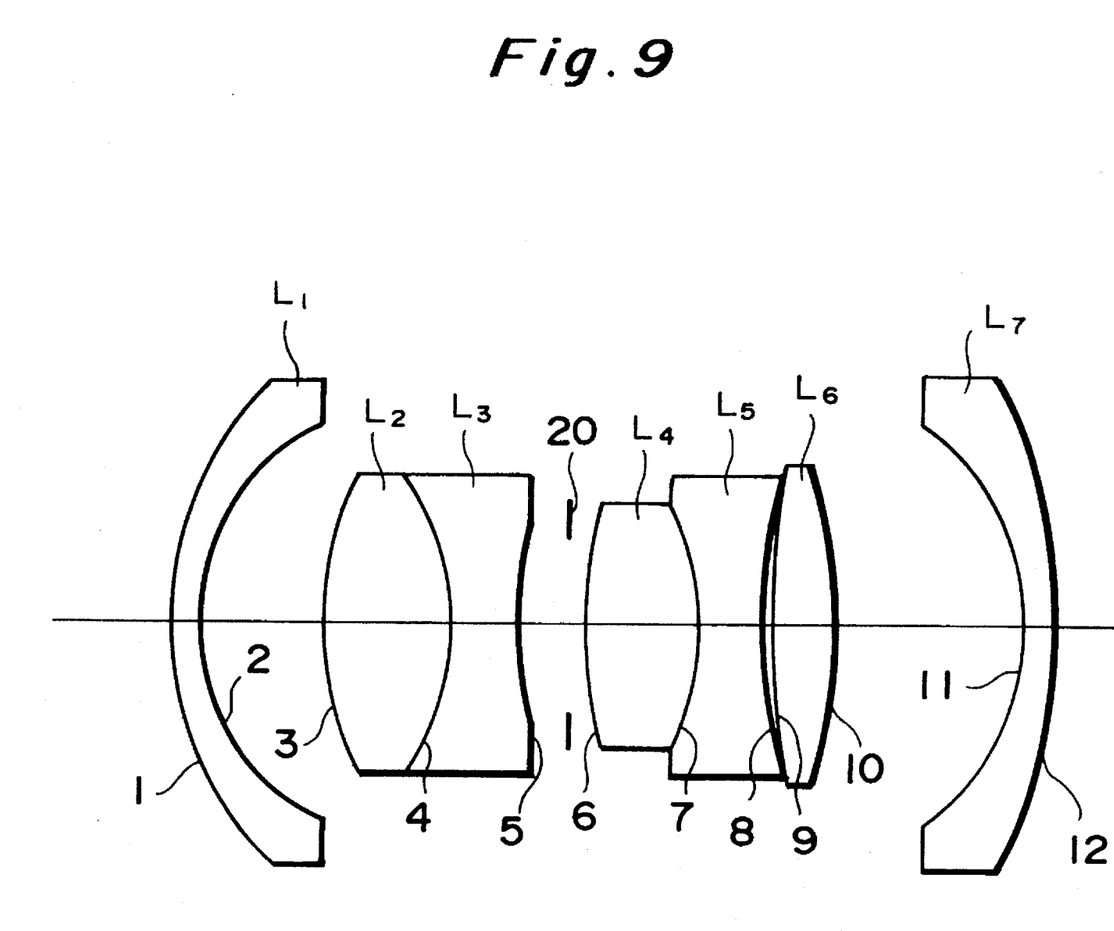
FIG. 9 is a schematic view showing the configuration of the wide angle lens system in accordance with Embodiment 5 of the present invention.

FIG. 9 shows the configuration of the wide angle lens system in accordance with this embodiment. In this embodiment, in order to satisfy the above-mentioned conditions (1) to (4), values are defined as follows:

$f_1/f = -1.64$ $f_{23}/f = 3.28$ $f_{45}/f = 1.73$ $(r_{11}+r_{10})/(r_{11}-r_{10}) = 2.86$

Figure 10A:
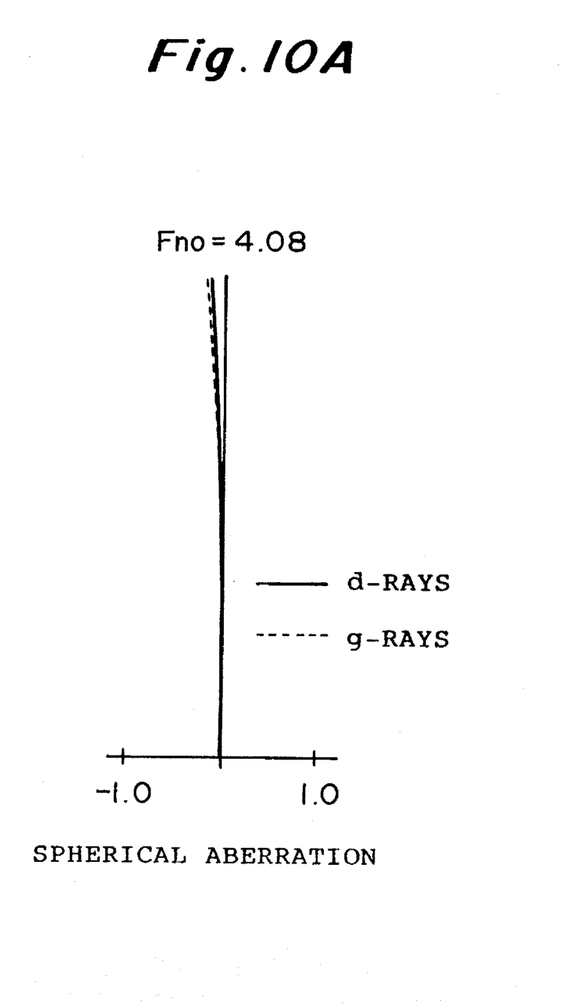
FIGS. 10A to 10C are aberration charts for the wide angle lens system in accordance with Embodiment 5 of the present invention.
Figure 10B:
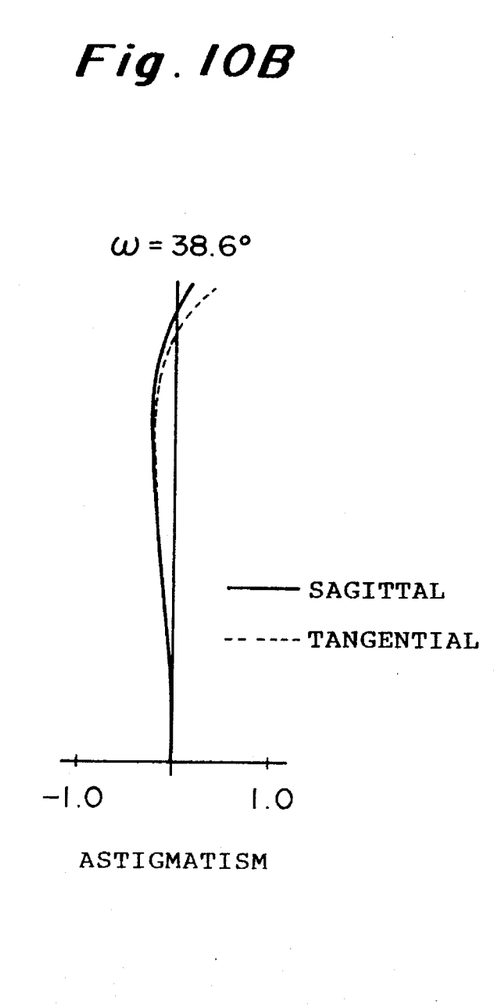
Figure 10C:
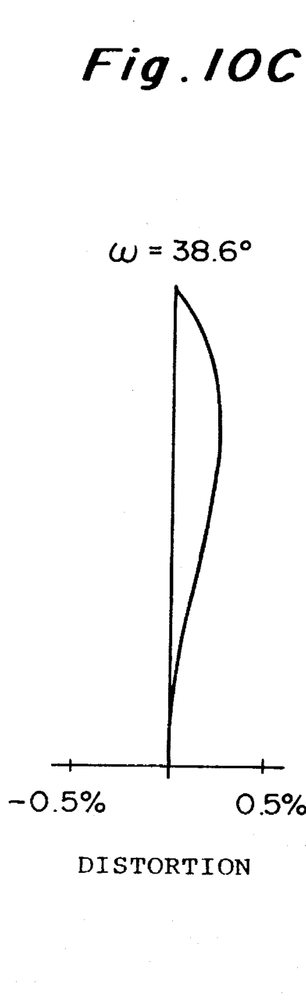

The overall characteristics of the wide angle lens system in Embodiment 5 and characteristics of the respective lenses therein are shown in Table 5, while its aberration characteristics are shown in FIGS. 10A to 10C. Here, in FIG. 10A, continuous curve and dotted curve respectively indicate spherical aberration and sine condition.

TABLE 5

| Surface Number | r | d | n | ν |
|---|---|---|---|---|
| 1 | 49.019 | 4.09 | 1.60183 | 49.75 |
| 2 | 31.749 | 18.18 | | |
| 3 | 49.215 | 18.57 | 1.57441 | 57.57 |
| 4 | −36.055 | 9.09 | 1.58258 | 50.33 |
| 5 | 55.072 | 10.23 | | |
| 6 | 77.657 | 16.19 | 1.84979 | 41.91 |
| 7 | −39.517 | 8.92 | 1.73751 | 31.89 |
| 8 | 79.522 | 1.76 | | |
| 9 | 153.970 | 8.75 | 1.75192 | 47.97 |
| 10 | −76.215 | 27.27 | | |
| 11 | −36.730 | 4.09 | 1.60231 | 42.53 |
| 12 | −80.674 | 45.50 | | | f = 100.00   $F_{no}$ = 4.08   2ω = 77.2°

Embodiment 6

Figure 11:
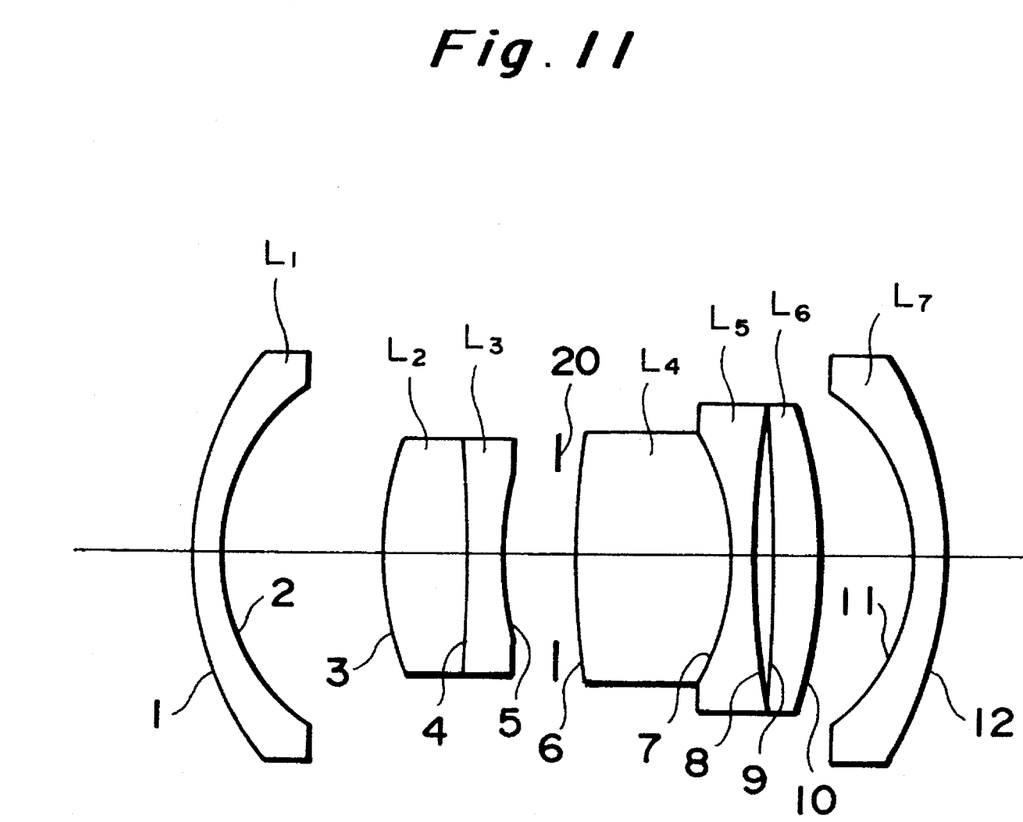
FIG. 11 is a schematic view showing the configuration of the wide angle lens system in accordance with Embodiment 6 of the present invention.

FIG. 11 shows the configuration of the wide angle lens system in accordance with this embodiment. In this embodiment, in order to satisfy the above-mentioned conditions (1) to (4), values are defined as follows:

$f_1/f = -1.84$ $f_{23}/f = 1.60$ $f_{45}/f = 1.41$ $(r_{11}+r_{10})/(r_{11}-r_{10}) = 2.73$

Figure 12A:
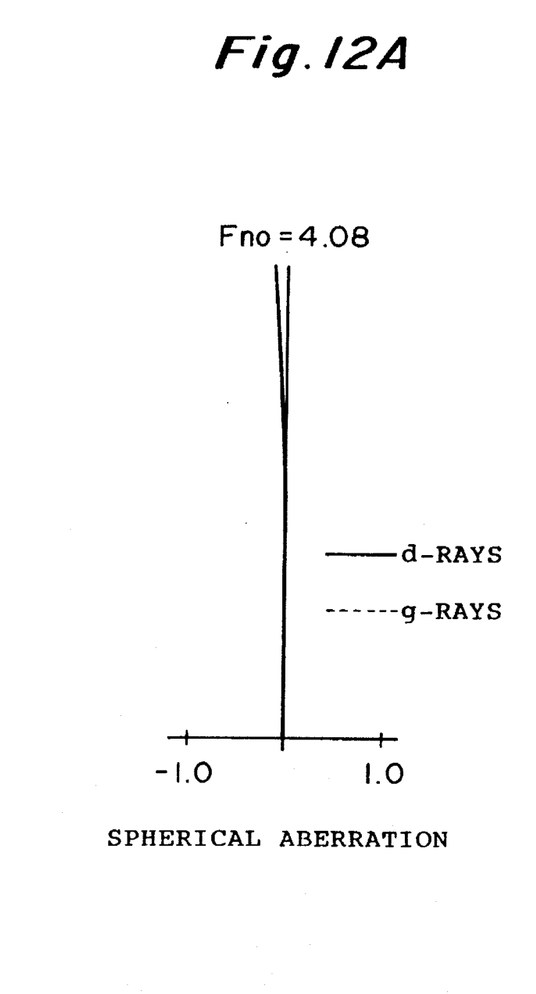
FIGS. 12A to 12C are aberration charts for the wide angle lens system in accordance with Embodiment 6 of the present invention.
Figure 12B:
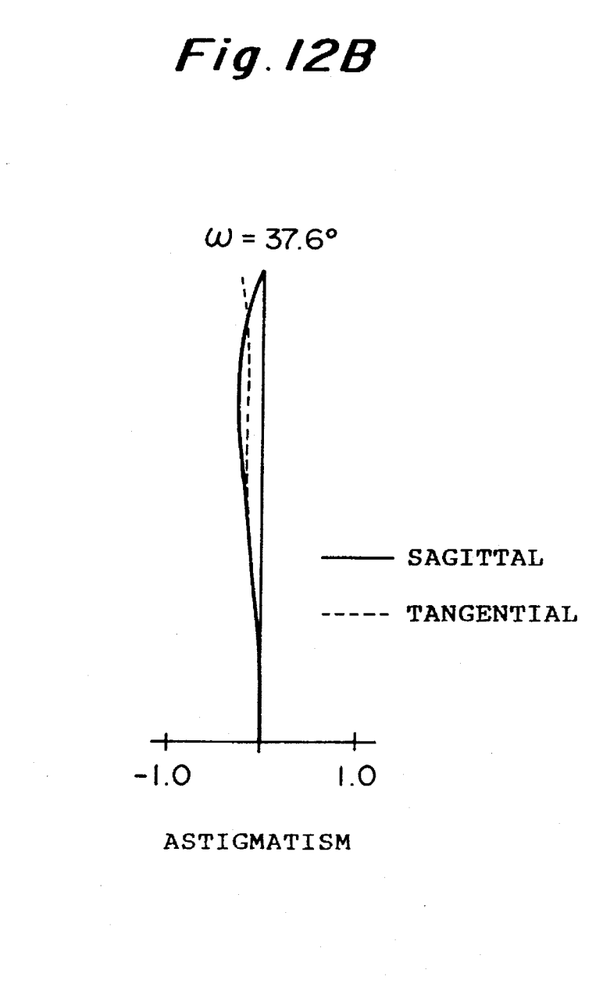
Figure 12C:
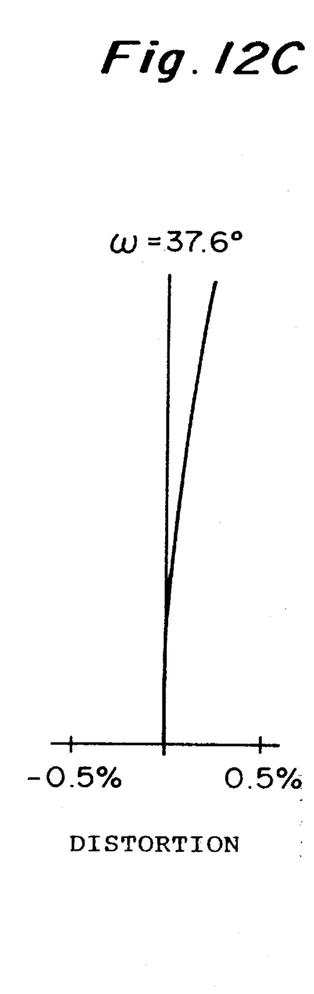

The overall characteristics of the wide angle lens system in Embodiment 6 and characteristics of the respective lenses therein are shown in Table 6, while its aberration characteristics are shown in FIGS. 12A to 12C. Here, in FIG. 12A, continuous curve and dotted curve respectively indicate spherical aberration and sine condition.

TABLE 6

| Surface Number | r | d | n | ν |
|---|---|---|---|---|
| 1 | 46.515 | 3.96 | 1.48749 | 70.40 |
| 2 | 29.763 | 22.40 | | |
| 3 | 48.390 | 11.84 | 1.80500 | 39.60 |
| 4 | −301.015 | 4.99 | 1.78472 | 25.70 |
| 5 | 63.406 | 9.90 | | |
| 6 | 122.811 | 22.00 | 1.77250 | 49.60 |
| 7 | −35.829 | 2.66 | 1.58144 | 40.80 |
| 8 | 127.535 | 2.62 | | |
| 9 | −318.550 | 6.82 | 1.77250 | 49.60 |
| 10 | −64.166 | 13.18 | | |
| 11 | −29.763 | 3.96 | 1.58144 | 40.80 |
| 12 | −53.690 | 60.85 | | | f = 100.00   $F_{no}$ = 4.08   2ω = 75.2°

As explained in the foregoing, the wide angle lens system in accordance with the present invention can be constituted by a relatively small number of lenses, namely, seven sheets of lenses, while attaining an F number which is as bright as about 4 and securing a relatively large angle of view of about 75 degrees. Also, various kinds of aberration can be favorably corrected. Accordingly, a wide angle lens system in which high resolving power and high contrast are attained in a wide range of photographing from long shot to close-up can be provided.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.85471/1995 filed on Apr. 11, 1995 is hereby incorporated by reference.

What is claimed is:

1. A wide angle lens system comprising successively from an object side:

a negative meniscus first lens with a convex surface facing the object, a first junction lens composed of a positive second lens with a convex surface facing the object and a negative third lens with a concave surface facing an image, a second junction lens composed of a biconvex fourth lens and a biconcave fifth lens, a positive sixth lens with a convex surface facing the image, and a negative meniscus seventh lens with a convex lens facing the image, said lens system satisfying the following conditions (1) to (4):

(1) $-1.95 < f_1/f < -1.05$ (2) $1.05 < f_{23}/f < 3.60$ (3) $1.10 < f_{45}/f < 2.16$ (4) $1.53 < (r_{11}+r_{10})/(r_{11}-r_{10}) < 4.95$ wherein f is combined focal length of this wide angle lens system as a whole, $f_1$ is focal length of the first lens, $f_{23}$ is combined focal length of the second and third lenses, $f_{45}$ is combined focal length of the fourth and fifth lenses, $r_{10}$ is radius of curvature of the surface of the sixth lens facing the image, and $r_{11}$ is radius of curvature of the surface of the seventh lens facing the object.

2. A wide angle lens system according to claim 1, further comprising a stop disposed between said first and second junction lenses.

* * * * *